US012366353B1

(12) United States Patent
Dai et al.

(10) Patent No.: US 12,366,353 B1
(45) Date of Patent: Jul. 22, 2025

(54) INTELLIGENT LUMINOUS SHOWER CURTAIN WITH BUILT-IN LIGHT SOURCE

(71) Applicant: Shandong Haowei Daily Necessities Co., Ltd., Jining (CN)

(72) Inventors: Wenping Dai, Jining (CN); Zheng Sun, Jining (CN)

(73) Assignee: Shandong Haowei Daily Necessities Co., Ltd., Jining (CN)

( * ) Notice: Subject to any disclaimer, the term of this patent is extended or adjusted under 35 U.S.C. 154(b) by 0 days.

(21) Appl. No.: 18/977,697

(22) Filed: Dec. 11, 2024

(30) Foreign Application Priority Data

Nov. 29, 2024 (CN) ......................... 202422934476.4

(51) Int. Cl.

| | |
|---|---|
| ***F21V 33/00*** | (2006.01) |
| ***A47H 23/00*** | (2006.01) |
| ***A47K 3/38*** | (2006.01) |
| ***F21S 4/22*** | (2016.01) |
| ***F21S 9/02*** | (2006.01) |
| ***F21V 17/08*** | (2006.01) |
| ***F21V 23/00*** | (2015.01) |
| ***F21V 23/04*** | (2006.01) |
| ***F21Y 105/12*** | (2016.01) |
| ***F21Y 115/10*** | (2016.01) |

(52) U.S. Cl.
CPC .............. *F21V 33/004* (2013.01); *A47K 3/38* (2013.01); *F21S 4/22* (2016.01); *F21S 9/02* (2013.01); *F21V 17/08* (2013.01); *F21V 23/006* (2013.01); *F21V 23/008* (2013.01); *F21V 23/04* (2013.01); *A47H 2023/006* (2013.01); *F21Y 2105/12* (2016.08); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2012/0212943 A1* | 8/2012 | Stoltz | F21V 31/00 362/217.1 | |
| 2018/0035837 A1* | 2/2018 | Scribner | A47H 21/00 | |
| 2023/0110656 A1* | 4/2023 | Tsibulevskiy | A47K 3/281 4/607 | |

* cited by examiner

*Primary Examiner* — Tsion Tumebo
(74) *Attorney, Agent, or Firm* — Birchwood IP

(57) ABSTRACT

An intelligent luminous shower curtain with a built-in light source is provided, which includes a shower curtain body, a light-emitting component provided in the shower curtain body and including a plurality of light-emitting units that are spaced apart from each other and arranged along an extension direction of the shower curtain body, a battery box provided on or outside the shower curtain body and provided with a battery and a control device. The battery is configured to supply power to the control device, and the control device is electrically connected to the light-emitting component for controlling an operation of the light-emitting component; the shower curtain body is provided with a translational structure configured to install the shower curtain body and the battery box on a hanging rod or a sliding rail. The control device in the battery box intelligently controls a light-emitting mode of the light-emitting component.

9 Claims, 10 Drawing Sheets

INTELLIGENT LUMINOUS SHOWER CURTAIN WITH BUILT-IN LIGHT SOURCE

CROSS-REFERENCE TO RELATED APPLICATIONS

This application claims priority to Chinese Patent Application No. 202422934476.4, filed on Nov. 29, 2024, which is hereby incorporated by reference in its entirety.

TECHNICAL FIELD

The present disclosure relates to the field of shower curtain technologies, and in particular, to an intelligent luminous shower curtain with a built-in light source.

BACKGROUND

A shower curtain is usually hung outside a bathtub or a shower area to effectively prevent water splashes and keep the bathroom dry. Furthermore, when the indoor temperature is low, the shower curtain can also gather hot steam to maintain the temperature of the shower area.

Traditional shower curtains are generally designed only on the shower curtain itself to meet consumers' aesthetic needs, such as adjusting the material, pattern, printing and other elements of the shower curtain. However, the above adjustments are limited to the shower curtain itself and are static, often lacking the function of improving the visibility and atmosphere of the shower space. In order to increase the function of the shower curtain and provide a better shower atmosphere, some shower curtains with lighting have also emerged in existing technology. However, the popular shower curtains with lighting on the market have external lighting, which means that the shower curtain and the lighting device are installed separately. The lighting device is hung on a shower curtain body or directly uses a separate light curtain, which seriously affects consumers' bathing experience and has poor practicality. At the same time, in the popular shower curtains with light-emitting devices on the market, due to the fact that the light-emitting devices are always on and consume a lot of electricity, if these light-emitting devices are powered by batteries, without a reasonable lighting control system, the battery cannot guarantee the battery life of the light-emitting devices when they are constantly on, and can only maintain three days of working electricity. Therefore, lighting devices are generally connected to external batteries. Due to the humidity in the bathroom, if the batteries are connected externally, there will be significant safety peril.

SUMMARY

To solve the above problems, the present disclosure proposes an intelligent luminous shower curtain with a built-in light source.

The technical solution adopted by the present disclosure is an intelligent luminous shower curtain with a built-in light source, including:

- a shower curtain body;
- a light-emitting component, which is provided in the shower curtain body and includes a plurality of light-emitting units that are spaced apart from each other and arranged along an extension direction of the shower curtain body;
- a battery box, which is provided on or outside the shower curtain body and provided with a battery and a control device inside; the battery is configured to supply power to the control device, and the control device is electrically connected to the light emitting component and configured to control an operation of the light emitting component;
- where the shower curtain body is provided with a translational structure configured to install the shower curtain body and the battery box on a hanging rod or a sliding rail.

The following further provide several optional modes, but they do not serve as additional limitations on the present disclosure. Without technical or logical contradictions, each embodiment can be combined separately, or it can be a combination between theses embodiment.

In some embodiments of the present disclosure, the light-emitting units are LED light beads, which are provided on a flexible light strip or electrically connected to each other.

In some embodiments of the present disclosure, there are at least four distribution modes of the plurality of light-emitting units provided on the shower curtain body, that is, a circular distribution, a planar distribution, a horizontal distribution, and a longitudinal distribution.

In some embodiments of the present disclosure, the control device includes an integrated circuit board fixed in the battery box, and the integrated circuit board is provided with a plug-in interface and a touch switch, where the plug-in interface is configured for a wire end of the light-emitting component to be inserted and electrically connected.

In some embodiments of the present disclosure, the battery box includes a base and a front cover that is disassembly provided on the base, the base is provided with at least one battery installation cavity configured to install the battery, the integrated circuit board is provided in the base, and one end of the touch switch is extended to an outside of the base.

In some embodiments of the present disclosure, the integrated circuit board is provided with an induction switch, the induction switch is configured to sense an external environment change of the shower curtain body or a motion state of the shower curtain body and transmit an induction signal to the integrated circuit board.

In some embodiments of the present disclosure, the battery box is provided on the shower curtain body, an upper of the shower curtain body is provided with a plurality of hanging holes spaced apart from each other along a longitudinal direction.

In some embodiments of the present disclosure, the translational structure includes a first hook and a second hook hung on the hanging rod, the battery box is provided with a hanging piece, and the hanging piece is provided in one of the hanging holes, the first hook is provided on the hanging piece, and the second hook passes through the hanging holes.

In some embodiments of the present disclosure, the first hook includes:

- a hook main body, hung on the hanging rod;
- a connection piece, which is fixed at one end of the hook main body and is provided with a clamping structure configured to install the hanging piece.

In some embodiments of the present disclosure, the connection piece is provided on a rear side of the shower curtain body, the clamping structure is a socket provided on the connection piece, the hanging piece is provided with an annular groove for the socket to be clamped, an end of the hanging piece is provided with an anti-detachment block configured to prevent the connection piece from detaching from the hanging piece in a horizontal direction.

Compared with the existing technology, the present disclosure has the following beneficial effects.

1. By providing the light-emitting component in the shower curtain body, it can increase the illumination of a shower area and adjust the atmosphere of the lighting decoration without changing the traditional appearance of the shower curtain, with functionality and aesthetics.

2. Providing a battery box on the shower curtain body and embedding the battery in the battery box, coupled with an integrated circuit board located in the battery box, which can directly provide power to the light-emitting component without a need for an external power supply. While ensuring safe power supply, an intelligent control way is used to adjust a light-emitting mode of the light-emitting component (such as light color, light brightness, light switching, switching speed, light on/off, etc.), which can effectively reduce energy consumption and render the flashing of the light more beautiful.

3. With vibration induction, light induction, infrared induction, thermal release induction and other ways to activate the light-emitting component (such as when using vibration induction, the human body touches the shower curtain body and renders it move, and the induction switch senses the vibration signal, the light-emitting component will emit light, which will last for a certain period of time), thereby effectively utilizing human interaction to drive the light-emitting component to work. In this process, it can create interaction between the user and the shower curtain, create a good shower atmosphere, and be in standby mode for a long time without induction signal. The energy consumption is much lower than that of similar ordinary products, and it can maintain working electricity for more than three months under normal use.

4. The light-emitting component can be made of LED flexible light strips or a series of LED light beads, with low power consumption and good waterproof performance. At the same time, the shower curtain is also made of waterproof materials, with a good overall waterproof effect.

BRIEF DESCRIPTION OF DRAWINGS

In order to provide a clearer explanation of the embodiments of the present disclosure or the technical solutions in the prior art, a brief introduction will be given to the accompanying drawings required for the description of the embodiments or the prior art. It is obvious that the accompanying drawings described below are only some embodiments of the present disclosure. For those skilled in the art, other drawings can be obtained based on the structures shown in these drawings without creative work.

NUMERAL REFERENCE

Figure 1:
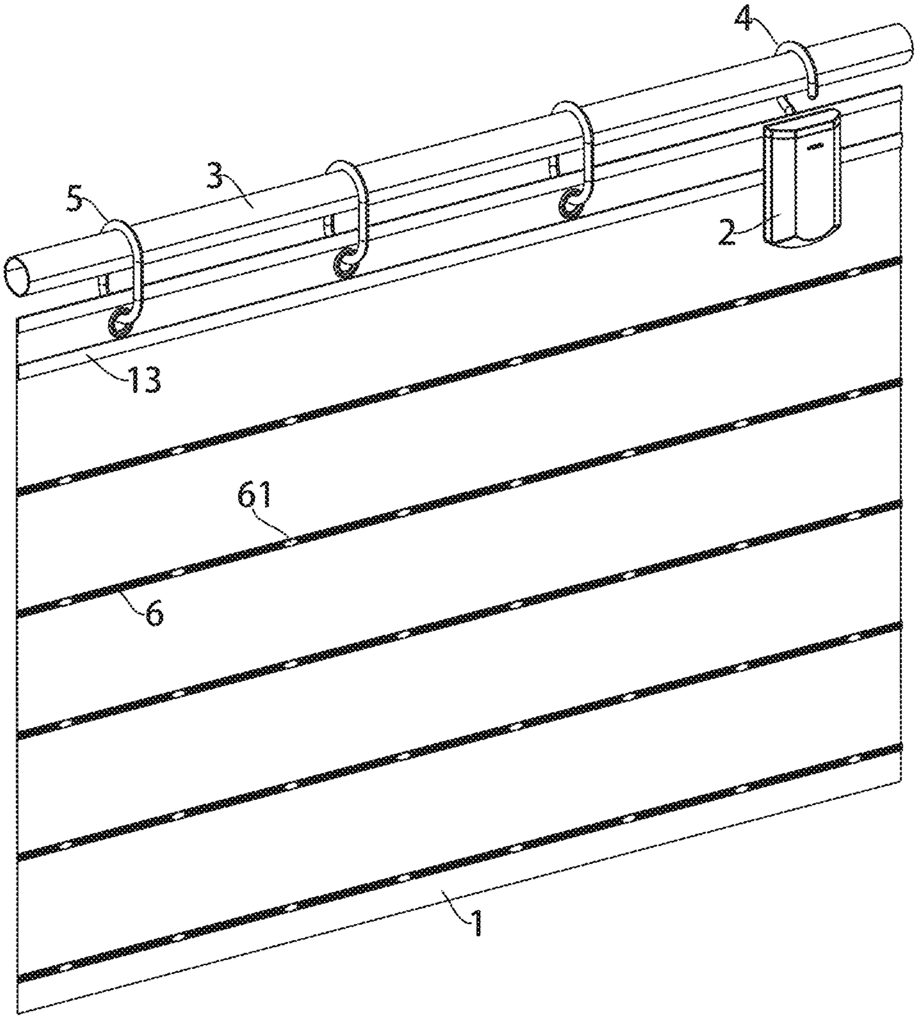
FIG. 1 is an overall structural diagram of a front view of an installation of a luminous shower curtain on a hanging rod in an embodiment of the present application.

1—shower curtain body, 11—hanging hole, 12—ring edge, 13—cover strip, 2—battery box, 21—base, 211—first positioning port, 212—first clamp port, 213—second positioning port, 214—second clamp port, 215—third clamp port, 216—battery installation cavity, 22—front cover, 221—first clamp block, 222—second clamp block, 223—third clamp block, 23—bottom cover, 231—notch, 24—hanging piece, 241—annular groove, 242—convex rib, 243—anti-detachment block, 3—hanging rod, 4—first hook, 41—hook main body, 42—connection piece, 421—socket, 422—limit notch, 5—second hook, 51—opening, 6—light-emitting component, 61—LED light bead, 7—battery, 8—control device, 81—integrated circuit board, 82—plug-in interface, 83—touch switch.

The implementation, functional characteristics, and advantages of the purpose of the present disclosure will be further explained in combination with the embodiments and with reference to the accompanying drawings.

DESCRIPTION OF EMBODIMENTS

The following will provide a clear and complete description of the technical solution in the embodiments of the present disclosure, based on the accompanying drawings. Obviously, the described embodiments are only a part of the embodiments of the present disclosure, not all of them. Based on the embodiments in the present disclosure, all other embodiments obtained by those skilled in the art without creative work are within the protection scope of the present disclosure.

It should be noted that all directional indications (such as up, down, left, right, front, back, etc.) in embodiments of the present disclosure are only used to explain a relative position relationship and motion of each component in a specific posture (as shown in the attached drawings). If a specific posture is changed, the directional indication will also be changed accordingly.

Besides that, expressions of "first", "second", etc. in the present disclosure are only for a descriptive purpose and cannot be understood as indicating or implying a relative importance or implying the number of technical features indicated. Therefore, features that are referred to "first" and "second" can explicitly or implicitly include at least one of these features. In addition, the technical solutions between various embodiments can be combined with each other, but they must be based on the ability of those skilled in the art to implement them. When the combination of technical solutions is contradictory or impossible to achieve, it should be considered that this combination of technical solutions does not exist and is not within the protection scope of the present disclosure.

Specific implementation modes, referring to FIGS. 1-10, the present disclosure provides an intelligent luminous shower curtain with a built-in light source, including:

a shower curtain body 1;

a light-emitting component 6, which is provided in the shower curtain body 1 and includes a plurality of light-emitting units that are spaced apart from each other and arranged along an extension direction of the shower curtain body 1;

a battery box 2, which is provided on or outside the shower curtain body 1 and is provided with a battery 7 and a control device 8 in the battery box 2; the battery 7 is configured to supply power to the control device 8, and the control device 8 is electrically connected to the light-emitting component 6 and configured to control an operation of the light-emitting component 6;

the shower curtain body 1 is provided with a translational structure configured to install the shower curtain body 1 and the battery box 2 together on a hanging rod 3 or a sliding rail.

Figure 3:
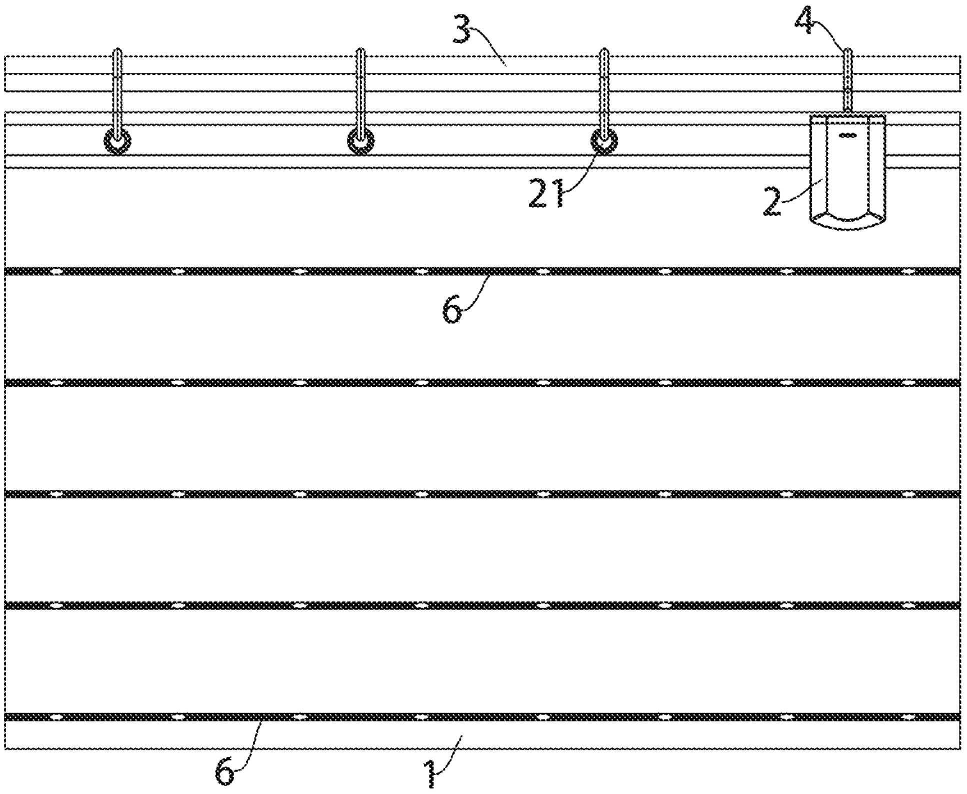
FIG. 3 is a front view of the installation of the luminous shower curtain on the hanging rod in an embodiment of the present application.

In an implementation mode, please refer to FIGS. 1 and 3. The light-emitting component 6 can be a flexible LED strip, and the flexible LED strip is provided with a plurality of LED light beads 61. When using the LED strip, the LED strip can be directly fixed inside the shower curtain body 1.

Please refer to FIG. 1, which is one way to fix the LED light strip. After the LED light strip is preliminarily fixed, the LED light strip is then glued onto the shower curtain body 1 through a cover strip 13, and the entire LED light strip is covered so as to complete a built-in installation of the LED light strip.

Besides that, the light-emitting component 6 can also use a series of LED light beads 61, and all LED light beads 61 are connected by wires. When using independent LED light beads 61, the LED light beads 61 need to be distributed and fixed inside the shower curtain body 1. Please note that for a connection of the LED light beads 61, various connection ways such as series connection, parallel connection, hybrid connection, and cross array connection can be used.

In this embodiment, there are at least four distribution modes of the plurality of light-emitting units on the shower curtain body 1, that is, a circular distribution, a planar distribution, a horizontal distribution, and a longitudinal distribution.

For example, when the plurality of light-emitting units are horizontally distributed on the shower curtain body 1, please refer to FIGS. 1 and 3. Here, the light-emitting component 6 is a flexible LED light strip, and there are multiple LED lights extending along a horizontal straight line, and adjacent LED light strips are arranged up and down in a spaced manner.

Figure 4:
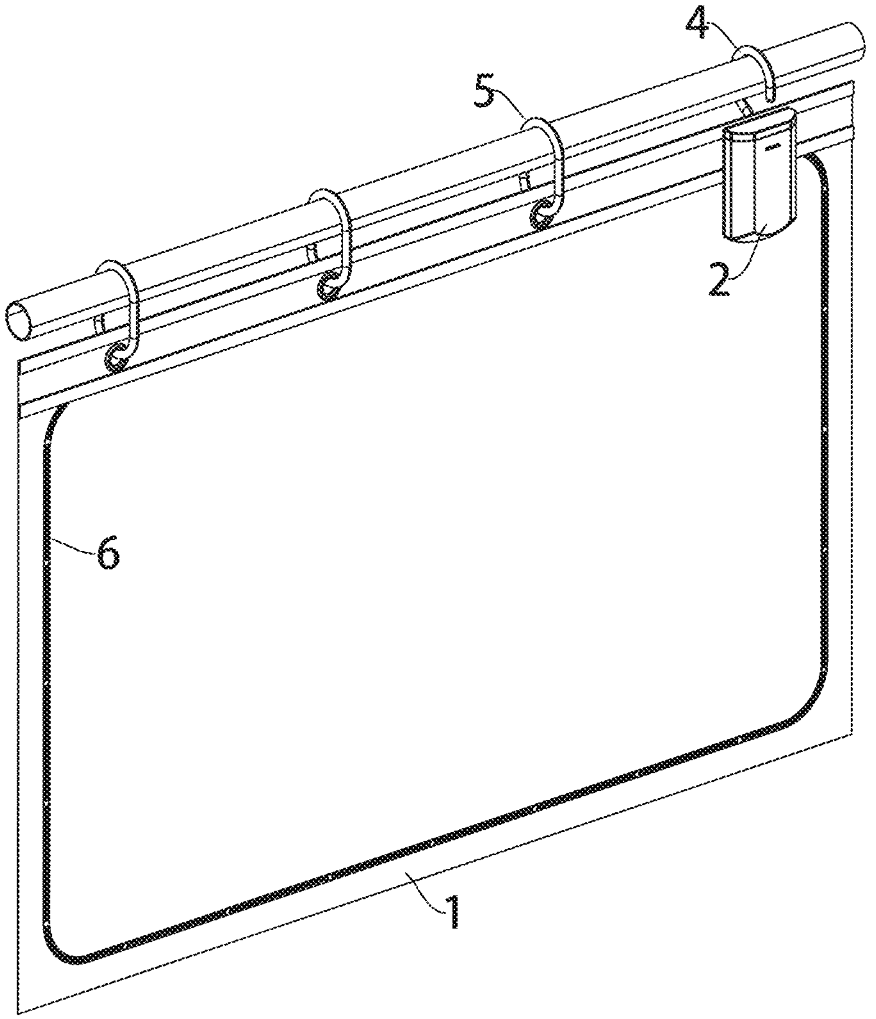
FIG. 4 shows an overall structural diagram of a circular distribution of light-emitting units in an embodiment of the present application.
Figure 5:
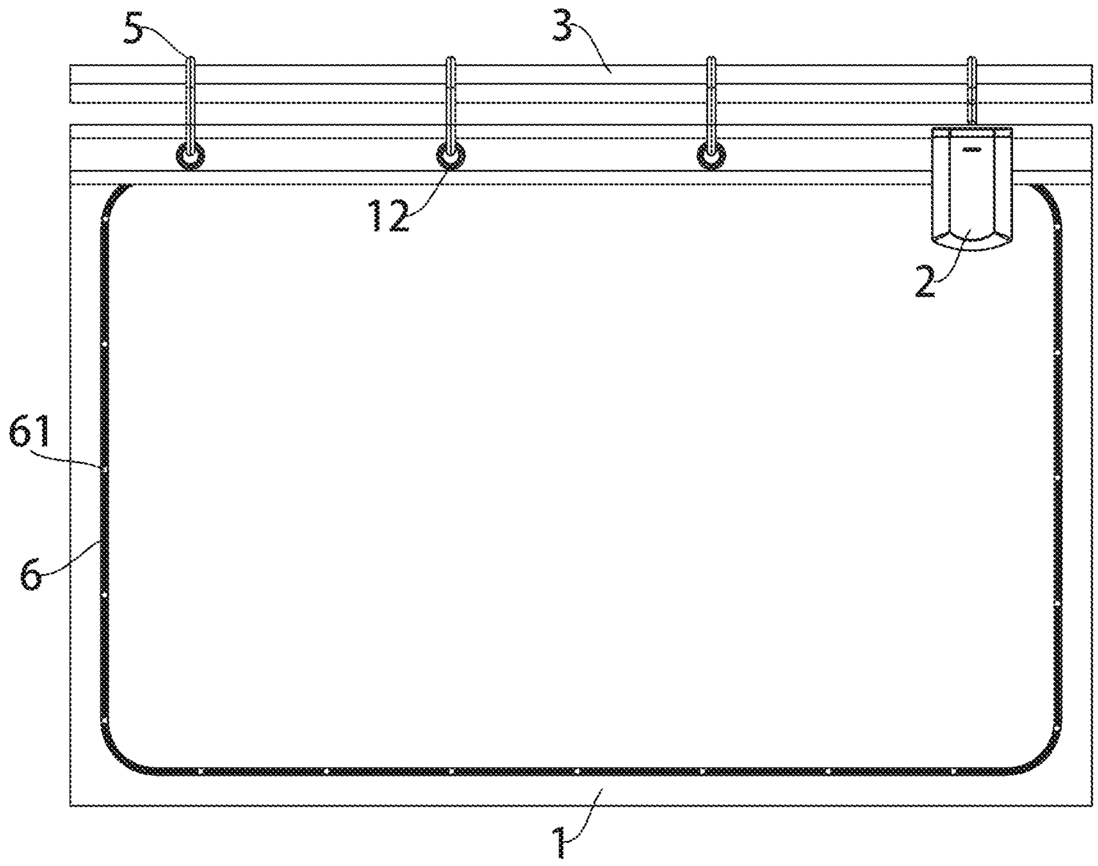
FIG. 5 is a front view of the circular distribution of the light-emitting units in an embodiment of the present application.

Then, when the plurality of light-emitting units are distributed in a circular manner on the shower curtain body 1, please refer to FIGS. 4 and 5. Here, the light-emitting component 6 is a flexible LED light strip, and the LED light strip is arranged in a surrounding circular shape along an edge of the shower curtain body 1. When the light-emitting unit emits light, it is equivalent to the edge of the shower curtain body 1 emitting light, which looks very beautiful.

When the plurality of light-emitting units are longitudinally distributed on the shower curtain body 1 (not shown), the light-emitting component 6 is a flexible LED light strip, and there are multiple LED light strips extending in a straight line along a longitudinal direction, and adjacent LED light strips are arranged at left and right intervals.

When the plurality of 1 light-emitting units are distributed in a planar manner on the shower curtain body 1 (not shown), the light-emitting component 6 is individual LED light beads 61, and all LED light beads 61 can be evenly laid out on the shower curtain body 1 (equivalent to forming a light net).

Of course, in practical applications, the distribution of the light-emitting units can also be designed in other ways according to aesthetic and scene requirements, such as a heart-shaped distribution.

Figure 6:
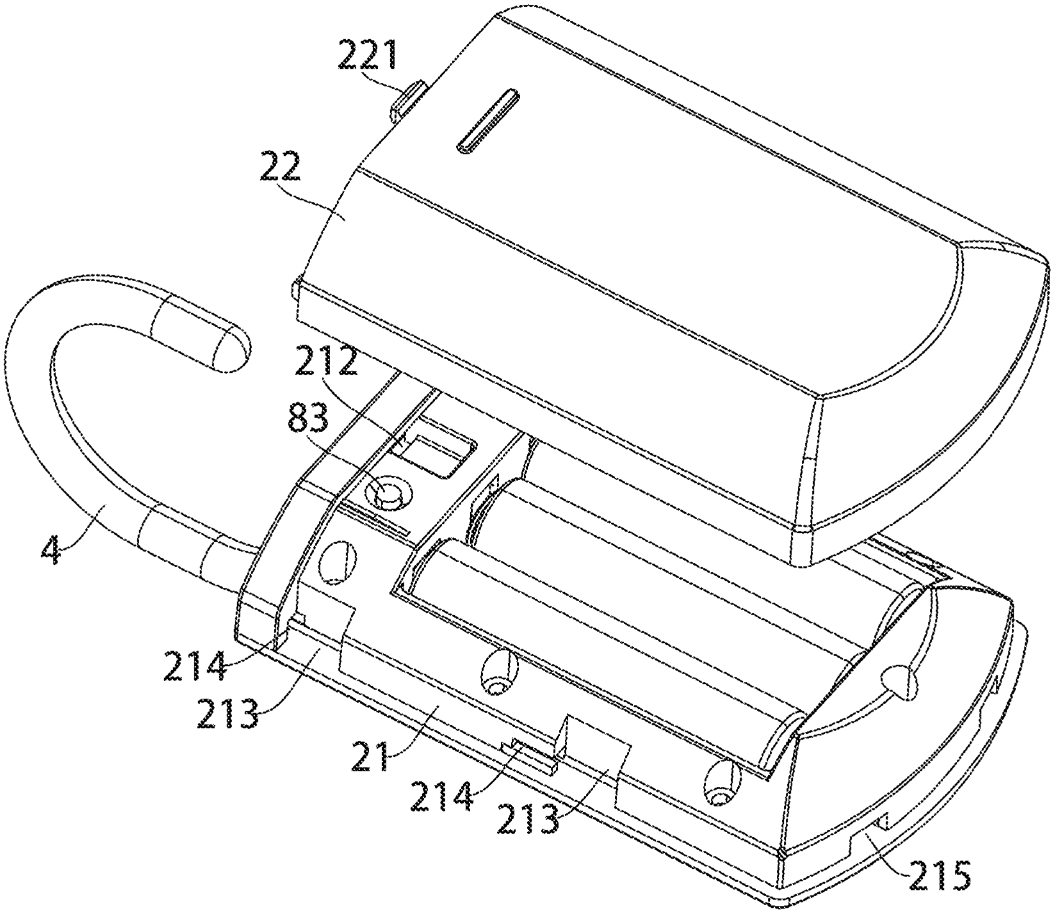
FIG. 6 is a schematic structural diagram of a first perspective of a front cover after separation from a base in an embodiment of the present application.
Figure 10:
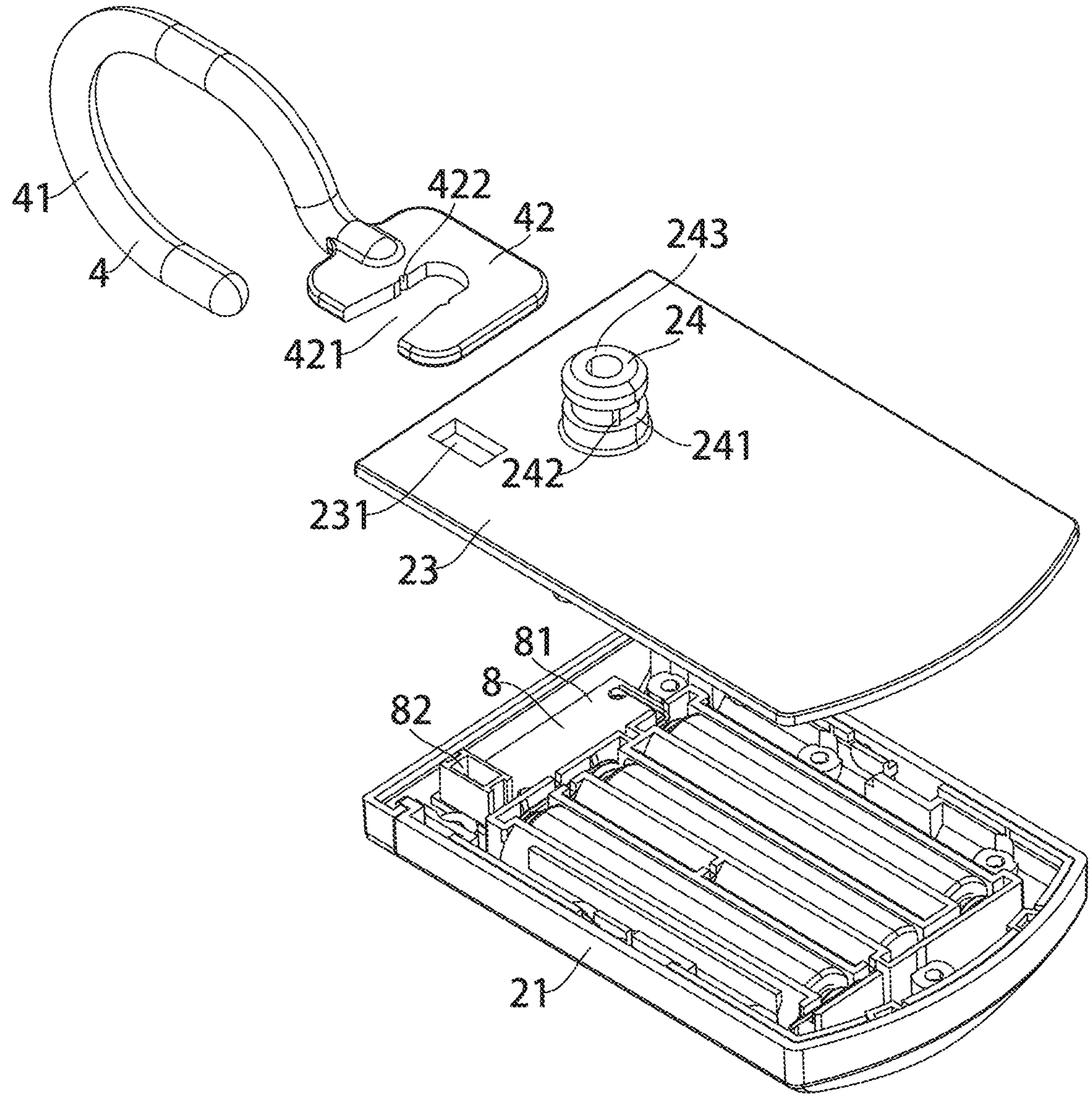
FIG. 10 is an exploded schematic diagram of a bottom cover, the base, and a first hook in an embodiment of the present application.

Please refer to FIGS. 6 and 10, it can be seen that in this embodiment, the control device 8 includes an integrated circuit board 81 fixed inside the battery box 2. The integrated circuit board 81 is provided with a plug-in interface 82 and a touch switch 83. The plug-in interface 82 is configured to cooperate with a wire end of the light-emitting component 6 for insertion and electrical connection.

Figure 7:
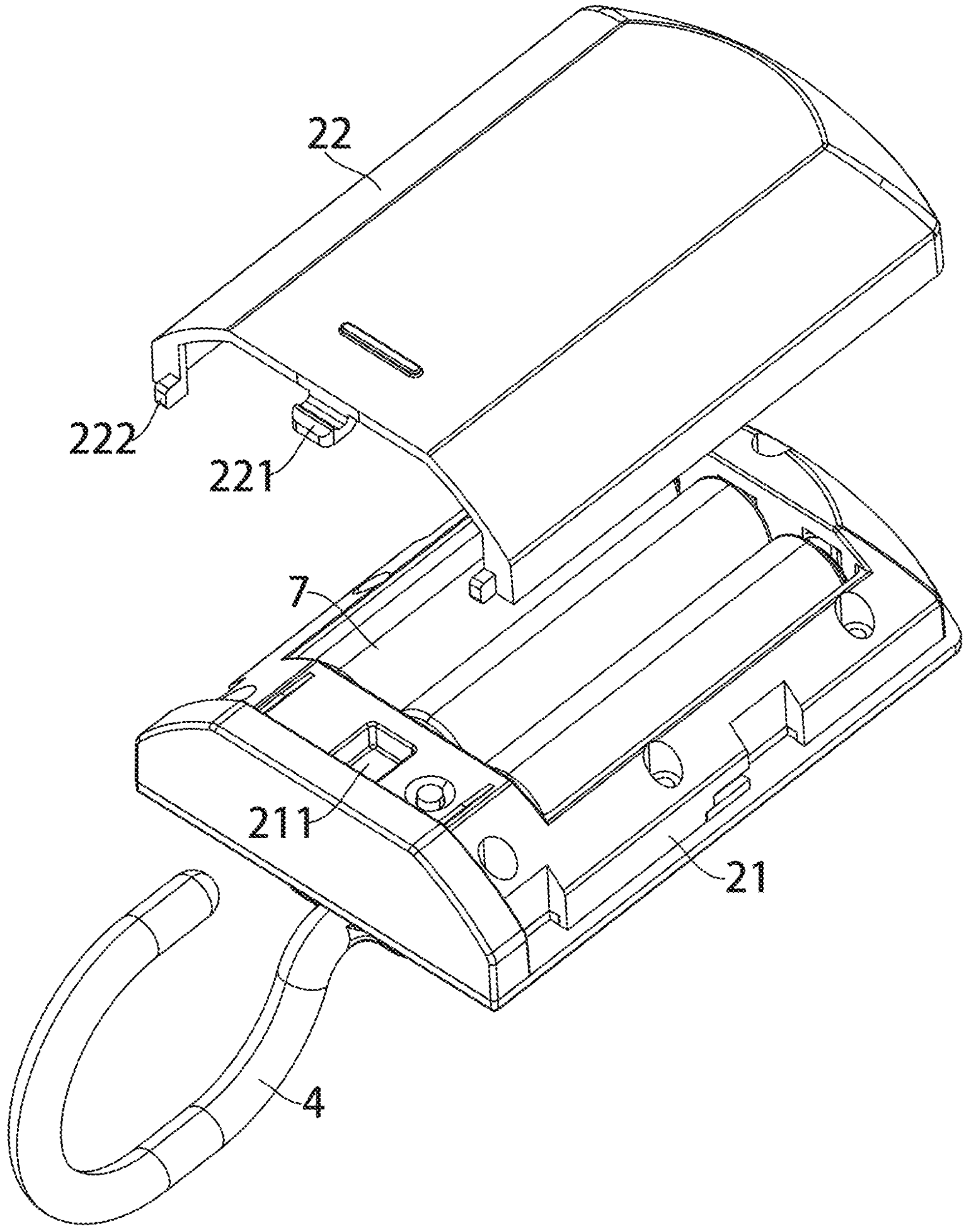
FIG. 7 is a schematic structural diagram of a second perspective of the front cover after separation from the base in an embodiment of the present application.
Figure 8:
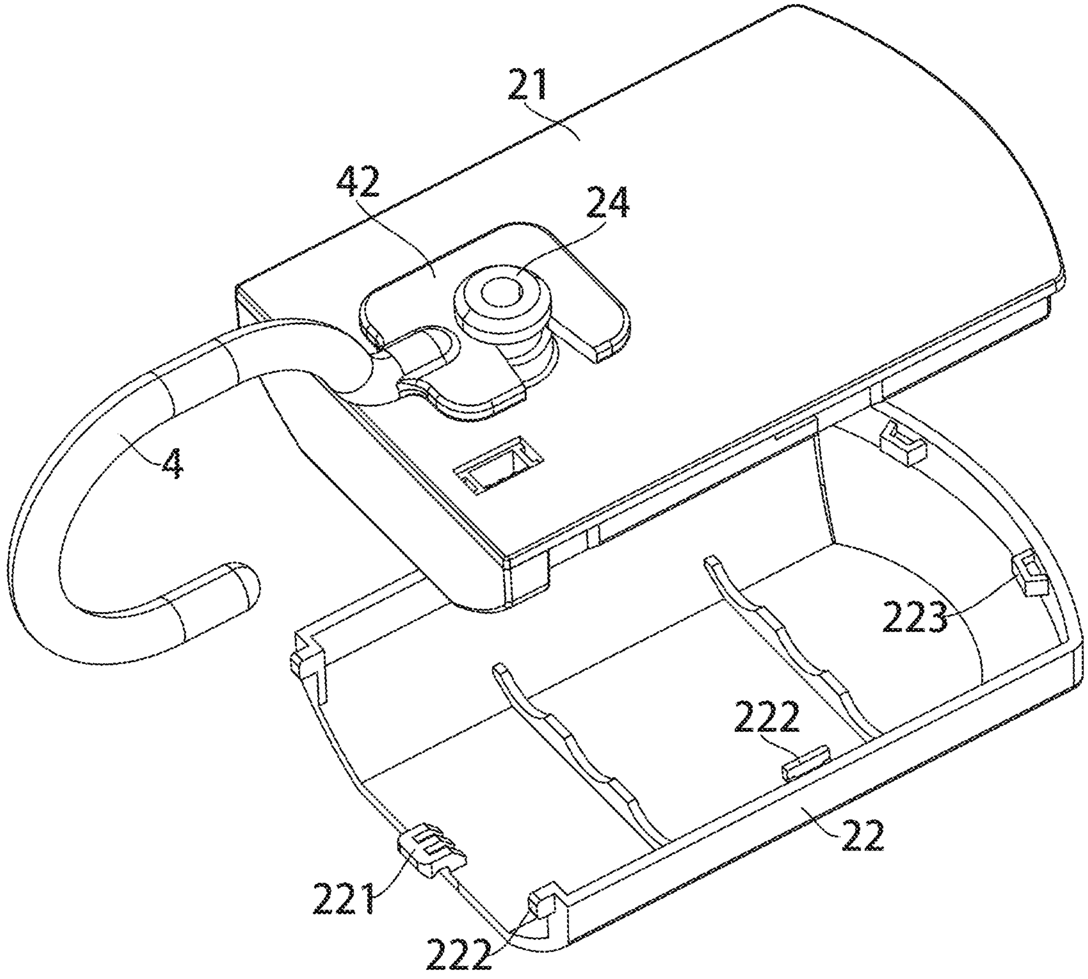
FIG. 8 is a schematic structural diagram of a third perspective of the front cover after separation from the base in an embodiment of the present application.
Figure 9:
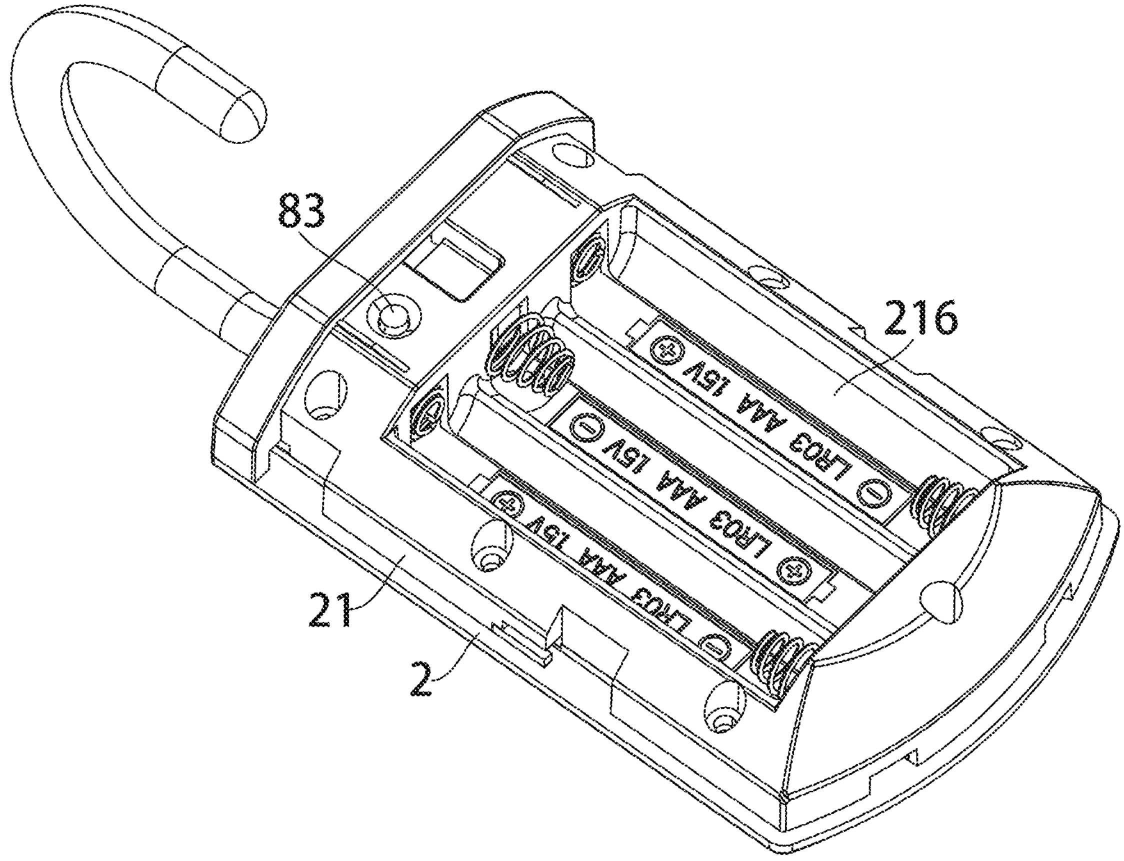
FIG. 9 is a schematic structural diagram of a battery box with the front cover hidden and a battery removed in an embodiment of the present application.

Please refer to FIGS. 6-8, it can be seen that in this embodiment, the battery box 2 includes a base 21 and a front cover 22 that can be disassembly provided on the base 21. The base 21 is provided with three battery installation cavities 216 for the battery 7 to be installed. The integrated circuit board 81 is provided in the base 21, and one end of the touch switch 83 is extended to an outside of the base 21.

In this embodiment, a front end of the base 21 is provided with a first positioning port 211 at an upper position, and an upper side of the first positioning port 211 is provided with a first clamp port 212. A side end of the base 21 is provided with two second positioning ports 213, upper sides of the two second positioning ports 213 are provided with a second clamp port 214. A lower end of the base 21 is provided with two third clamp ports 215. An upper end of the front cover 22 is provided with a first clamp block 221, a side end of the front cover 22 is provided with two second clamp blocks 222, and a lower end of the front cover 22 is provided with two third clamp blocks 223.

When it is necessary to install the front cover 22 on the base 21, the first clamp block 221 is aligned with the first positioning port 211 and it is placed in, the second clamp block 222 is aligned with the second positioning port 213 and it is placed in, then the front cover 22 is pushed upwards and the first clamp block 221 enters the first clamp port 212, the second clamp block 222 enters the second clamp port 214, and the third clamp block 223 enters the third clamp port 215, thus completing an assembly of the front cover 22 and the base 21.

When it is necessary to remove the front cover 22 from the base 21, the front cover 22 is pulled down and the first clamp block 221 is caused to be detached from the first clamp port 212, the second clamp block 222 is detached from the second clamp port 214, and the third clamp block 223 is detached from the third clamp port 215. Then, the front cover 22 is removed forward.

After the front cover 22 is removed, a user can replace the battery 7 by himself or press the touch switch 83 to complete a lighting control of the light-emitting component 6.

Please refer to FIG. 10, it can be seen that in this embodiment, a rear end of the base 21 is provided with a bottom cover 23, and the bottom cover 23 is provided with a notch 231 corresponding to the plug-in interface 82. The wire end of the light-emitting component 6 is inserted into the plug-in interface 82 through the notch 231.

In this embodiment, three battery installation cavities 216 are all placed with battery 7, which means that three AAA batteries 7 are placed in the battery box 2, which are worked together to supply power to the integrated circuit board 81 and the light-emitting component 6.

In this embodiment, the integrated circuit board 81 is provided with an induction switch configured to sense an external environment change of the shower curtain body 1 or a motion state of the shower curtain body 1 and transmit an induction signal to the integrated circuit board 81.

Here, the induction switch can be a vibration induction, a light induction, an infrared induction, a thermal release induction and other induction ways, or various mechanical switches can also be used for induction.

In this embodiment, the induction switch is a vibration switch, and a vibration signal comes from the opening and closing of the shower curtain body 1 or a collision with the shower curtain body 1. When the user interacts with the shower curtain body 1, that is, touches or pulls the shower curtain body 1, the vibration switch senses the vibration signal and transmits the induction signal to the integrated circuit board 81, and the integrated circuit board 81 controls the light-emitting component 6 to emit light.

Please note that in this embodiment, the integrated circuit board 81 controls the LED light beads 61 to flash for 10 seconds after being powered on and then turn off, and flashes for 10 seconds when a vibration signal is detected for each time.

Here, regarding the frequency of light flashing, it can be adjusted by opening the front cover 22 and tapping the touch switch 83 inside the battery box 2. The touch switch 83 is pressed for a short time to select three gears: slow, medium, and fast, with the default being medium. At the same time, the touch switch is pressed and held for more than 835 seconds to switch to a holiday mode, which defaults to flashing for a long time and turns off when the vibration signal is received. After receiving the vibration signal again, it flashes for a long time until the next vibration signal is ended. In this embodiment, in addition to flashing, the light signal mode can also be set to various modes such as long on, flowing, and rainbow.

In this embodiment, the light-emitting component 6 has multiple lighting options, including stable lighting, emotional lighting, or automatic lighting. The user can choose the lighting options of the light-emitting component 6 according to his needs. When the light-emitting component 6 is activated, the light-emitting component 6 is illuminated according to a set lighting option.

In this way, by pulling or touching the shower curtain, the shower curtain can emit light, effectively improving visibility in low light conditions. It can also use changes in light color, flickering and light to render the entire shower curtain more dynamic, allowing the elements in the shower curtain to break out of the curtain and combine with the space, thereby creating a better shower atmosphere and enhancing the aesthetic appeal of the bathroom environment.

Please note that in this embodiment, the shower curtain is made of standard waterproof and anti-mold materials such as PEVA (Polyethylene-vinyl acetate), EVA (Ethylene Vinyl Acetate Copolymer), Polyester, PVC (Polyvinyl chloride), etc. The battery box 2 also has good waterproof performance, and the LED light strips or LED light beads 61 in the light-emitting component have good waterproof performance. Therefore, it is equivalent to the entire intelligent luminous shower curtain having very good waterproof performance, which can meet the safe use in humid environments such as bathrooms.

Figure 2:
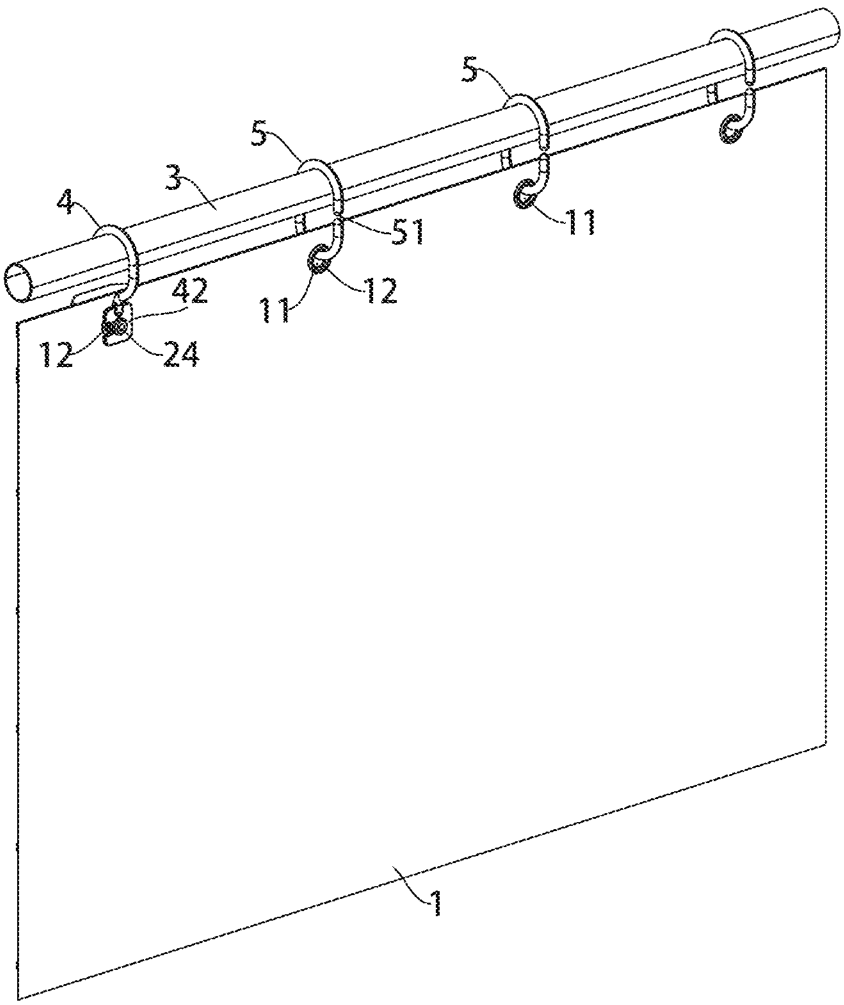
FIG. 2 is an overall structural diagram of a rear perspective of the installation of the luminous shower curtain on the hanging rod in an embodiment of the present application.

Then, referring to FIGS. 1 and 2, it can be seen that in this embodiment, the battery box 2 is provided on the shower curtain body 1, an upper of the shower curtain body 1 is provided with a plurality of spaced hanging holes 11 along a longitudinal direction, and the edges of the hanging holes 11 are provided with a ring edge 12.

Please refer to FIGS. 1 and 8, it can be seen that in this embodiment, the translational structure includes a first hook 4 and a second hook 5 hung on the hanging rod 3. The battery box 2 is provided with a hanging piece 24, and the hanging piece 24 is provided in one of the hanging holes 11. The first hook 4 is provided on the hanging piece 24, and the second hook 5 passes through the hanging holes 11.

In this embodiment, the second hook 5 uses a standard shower curtain hook, and the hanging holes 11 on the shower curtain also use standard shower curtain hanging holes 11. A connection between the second hook 5 and the hanging holes 11 belongs to the prior art, and only a brief explanation is provided here.

Please refer to FIG. 2, it can be seen that an opening 51 is provided on the second hook 5, a rotating position is provided on the second hook 5. The rotating position divides the second hook 5 into an upper part and a lower part. When the upper and lower parts of the second hook 5 are misaligned, the second hook 5 can be hung in the hanging holes 11 and hung on the hanging rod 3. Then, the upper and lower parts of the second hook 5 can be reset.

Then, please refer to FIG. 10, the first hook 4 includes:

- a hook main body 41, hung on hanging rod 3;
- a connection piece 42, which is fixed at one end of the hook main body 41 and is provided with a clamping structure configured to install the hanging piece 24.

In an implementation mode, the connection piece 42 is provided on a rear side of the shower curtain body 1, and the clamping structure is a socket 421 provided on the connection piece 42. The hanging piece 24 is provided with an annular groove 241 configured for the socket 421 to be clamped, and an end of the hanging piece 24 is provided with an anti-detachment block 243 configured to prevent the connection piece 42 from detaching from the hanging piece 24 in a horizontal direction.

In an implementation mode, a groove wall of the annular groove 241 is provided with a convex rib 242, an inner wall of the socket 421 is provided with a limit notch 422. When the annular groove 241 of the hanging piece 24 is clamped in the socket 421, the convex rib 242 is clamped into the limit notch 422, thereby further fixing a relative position of the connection piece 42 and the hanging piece 24. Furthermore, during a hanging process of the shower curtain, the anti-detachment block 243 is provided in front of the connection piece 42 to prevent the connection piece 42 from detaching from the hanging piece 24 from the front side.

After the hanging piece 24 is inserted into the hanging holes 11, the battery box 2 can also be hung on the hanging rod 3 together with the shower curtain through the first hook 4. In this way, during the process of pulling and closing the shower curtain by hand, the battery box 2 is caused to move along with the shower curtain.

Of course, the battery box 2 can also be fixed to the shower curtain body 1 through processes such as welding, bonding, or sewing (without a need for the first hook 4), thus meeting the direct adaptation and use of standard hooks to complete the pulling and closing of the shower curtain body on the hanging rod 3. Beside that, the battery box 2 fixed in this way can be installed not only at an upper position of the shower curtain body 1, but also at a bottom position of the shower curtain body 1.

The above disclosed intelligent luminous shower curtain with a built-in light source of the present disclosure is only preferred embodiments of the present disclosure and does not limit the scope of the present disclosure. Any equivalent structural transformation made under the inventive concept of the present disclosure using the content of this specification and drawings, or directly/indirectly applied in other related technical fields, are included in the protection scope of the present disclosure.

What is claimed is:

1. An intelligent luminous shower curtain with a built-in light source, comprising:

a shower curtain body;

a light-emitting component, which is provided in the shower curtain body and comprises a plurality of light-emitting units that are spaced apart from each other and arranged along an extension direction of the shower curtain body;

a battery box, which is provided on or outside the shower curtain body and provided with a battery and a control device inside; the battery is configured to supply power to the control device, and the control device is electrically connected to the light emitting component and configured to control an operation of the light emitting component;

wherein the shower curtain body is provided with a translational structure configured to install the shower curtain body and the battery box on a banging rod or a sliding rail;

wherein the control device comprises an integrated circuit board fixed in the battery box, and the integrated circuit board is provided with a plug-in interface and a touch switch;

wherein the battery box comprises a base and a front cover that is disassembly provided on the base, the base is provided with at least one battery installation cavity configured to install the battery, the integrated circuit board is provided in the base, and one end of the touch switch is extended to an outside of the base.

2. The intelligent luminous shower curtain with a built-in light source according to claim 1, wherein the light-emitting units are LED light beads, which are provided on a flexible light strip or electrically connected to each other.

3. The intelligent luminous shower curtain with a built-in light source according to claim 2, wherein there are at least four distribution modes of the plurality of light-emitting units provided on the shower curtain body, that is, a circular distribution, a planar distribution, a horizontal distribution, and a longitudinal distribution.

4. The intelligent luminous shower curtain with a built-in light source according to claim 1, wherein the plug-in interface is configured for a wire end of the light-emitting component to be inserted and electrically connected.

5. The intelligent luminous shower curtain with a built-in light source according to claim 1, wherein the integrated circuit board is provided with an induction switch, the induction switch is configured to sense an external environment change of the shower curtain body or a motion state of the shower curtain body and transmit an induction signal to the integrated circuit board.

6. The intelligent luminous shower curtain with a built-in light source according to claim 4, wherein the battery box is provided on the shower curtain body, an upper of the shower curtain body is provided with a plurality of hanging holes spaced apart from each other along a longitudinal direction.

7. The intelligent luminous shower curtain with a built-in light source according to claim 6, wherein the translational structure comprises a first hook and a second hook hung on the hanging rod, the battery box is provided with a hanging piece, and the hanging piece is provided in one of the hanging holes, the first hook is provided on the hanging piece, and the second hook passes through the hanging holes.

8. The intelligent luminous shower curtain with a built-in light source according to claim 7, wherein the first hook comprises:

a hook main body, hung on the hanging rod;

a connection piece, which is fixed at one end of the hook main body and is provided with a clamping structure configured to install the hanging piece.

9. The intelligent luminous shower curtain with a built-in light source according to claim 8, wherein the connection piece is provided on a rear side of the shower curtain body, the clamping structure is a socket provided on the connection piece, the hanging piece is provided with an annular groove for the socket to be clamped, an end of the hanging piece is provided with an anti-detachment block configured to prevent the connection piece from detaching from the hanging piece in a horizontal direction.

* * * * *